US012729764B2

(12) United States Patent
Frait

(10) Patent No.: US 12,729,764 B2
(45) Date of Patent: Sep. 8, 2026

(54) VALVE BODY ASSEMBLY HAVING VALVE MEMBER

(71) Applicant: Ford Global Technologies, LLC, Dearborn, MI (US)

(72) Inventor: Steven Anatole Frait, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 54 days.

(21) Appl. No.: 19/013,576

(22) Filed: Jan. 8, 2025

(65) Prior Publication Data

US 2026/0194137 A1 Jul. 9, 2026

(51) Int. Cl.

*F16H 61/00* (2006.01)
*B33Y 80/00* (2015.01)
*F15B 13/08* (2006.01)
*F16K 11/22* (2006.01)
*F16K 27/02* (2006.01)

(52) U.S. Cl.

CPC .......... *F16H 61/0009* (2013.01); *B33Y 80/00* (2014.12); *F15B 13/0814* (2013.01); *F16H 61/0025* (2013.01); *F16K 11/22* (2013.01); *F16K 27/02* (2013.01)

(58) Field of Classification Search

CPC ............. F16H 61/0009; F16H 61/0003; F16H 61/0025; F16H 61/0028; F16H 61/0031; F15B 13/0814; F15B 13/0842; B33Y 80/00; F16K 27/0209; F16K 27/02; F16K 27/00; F16K 27/0263; F16K 27/048; F16K 27/04; F16K 27/029; F16K 27/003; F16K 11/22; F16K 11/24

See application file for complete search history.

(56) References Cited

U.S. PATENT DOCUMENTS 3,133,559 A * 5/1964 Tennis .................... F15B 13/08 137/625.69
3,641,879 A * 2/1972 Week .................. F16H 61/0025 60/424
5,794,651 A * 8/1998 Miller .................. F16K 31/363 251/30.02
5,829,560 A * 11/1998 Mainquist ........... F16H 61/0009 74/606 R
7,389,640 B2 * 6/2008 Muller ................ F16D 48/0206 60/430
7,415,820 B2 * 8/2008 Moorman ................ B60K 6/48 137/512.5

(Continued)

FOREIGN PATENT DOCUMENTS

GB 2572762 A * 10/2019 ............. B33Y 80/00

*Primary Examiner* — David Colon-Morales
(74) *Attorney, Agent, or Firm* — Burris Law, PLLC

(57) ABSTRACT

A valve body assembly that includes a valve body, a pump and a valve member. The valve body has multiple valve bores and hydraulic passages. The pump is coupled to the valve body and cooperates with the valve body to define a fluid circuit that is in communication with one or more of the hydraulic passages. The pump is configured to pump hydraulic fluid through the fluid circuit and into one or more of the hydraulic passages. The valve member is movable between a first position in which the valve member is seated against the pump to inhibit fluid flow through the fluid circuit and a second position in which the valve member is removed from the pump to permit fluid flow through the fluid circuit.

20 Claims, 7 Drawing Sheets

(56) References Cited

U.S. PATENT DOCUMENTS

| | | | | |
|---|---|---|---|---|
| 8,316,757 | B2 * | 11/2012 | Rinaldi | F16K 27/048 91/445 |
| 8,403,793 | B2 * | 3/2013 | Moorman | F16H 61/0031 475/116 |
| 8,915,076 | B2 * | 12/2014 | Xie | F16H 61/0031 60/420 |
| 8,974,347 | B2 * | 3/2015 | Shimizu | F16H 61/0031 475/137 |
| 9,022,345 | B2 * | 5/2015 | Bisig | F16K 11/00 251/83 |
| 9,982,796 | B2 * | 5/2018 | Perner | B29B 11/08 |
| 10,428,933 | B2 * | 10/2019 | Mills | F16H 61/0009 |
| 10,744,991 | B2 * | 8/2020 | Mayr | B60T 8/368 |
| 10,746,201 | B2 * | 8/2020 | Weickel | F16K 27/003 |
| 10,753,464 | B2 * | 8/2020 | Roskowski | F16H 61/0009 |
| 10,823,299 | B2 * | 11/2020 | Miyazoe | F15B 13/0842 |
| 11,014,544 | B2 * | 5/2021 | Zander | B60T 17/043 |
| 11,181,127 | B2 * | 11/2021 | Asahara | F15B 13/0839 |
| 11,465,213 | B2 * | 10/2022 | He | B33Y 10/00 |
| 11,608,841 | B2 * | 3/2023 | Funsch | F15B 13/0871 |
| 11,644,116 | B1 * | 5/2023 | Frait | F16K 27/003 137/594 |
| 11,662,031 | B2 * | 5/2023 | Martin | F16K 17/0406 137/625.48 |
| 11,680,589 | B1 | 6/2023 | Zähe | |
| 11,713,806 | B2 * | 8/2023 | Meid | F15B 13/02 60/413 |
| 11,867,298 | B2 * | 1/2024 | Haberstock | F16H 61/0276 |
| 11,933,328 | B2 * | 3/2024 | Asahara | F15B 11/16 |
| 11,982,367 | B2 * | 5/2024 | Kuhn | F16K 15/063 |
| 12,473,933 | B2 * | 11/2025 | Kusuda | F16H 61/0031 |
| 12,480,587 | B2 * | 11/2025 | Henley, III | F16K 15/04 |
| 2005/0104442 | A1 * | 5/2005 | Yang | F15B 13/0892 303/113.1 |
| 2005/0133102 | A1 * | 6/2005 | Blackman | F15B 13/0896 137/884 |
| 2010/0096027 | A1 | 4/2010 | Seto et al. | |
| 2018/0172146 | A1 * | 6/2018 | Uesugi | B22F 5/10 |
| 2018/0180070 | A1 * | 6/2018 | Uesugi | B33Y 70/00 |
| 2023/0184267 | A1 * | 6/2023 | Frait | F16L 41/03 137/351 |
| 2023/0184323 | A1 * | 6/2023 | Frait | F15B 13/085 137/354 |
| 2023/0184364 | A1 * | 6/2023 | Frait | F16H 61/0251 137/351 |

* cited by examiner 50
66
53
63
64
63
53
66
68
63
53
66
53
63
63
53
66
64
53
63

VALVE BODY ASSEMBLY HAVING VALVE MEMBER

FIELD

The present disclosure relates to a valve body assembly having a valve member.

BACKGROUND

The statements in this section merely provide background information related to the present disclosure and may not constitute prior art.

Transmission valve bodies typically consist of aluminum castings with worm trail routing of multiple connections between various working elements. These worm trail fluid paths typically must be two-dimensional, and cannot cross over the path of another trail. Due to this two-dimensional limitation of typical transmission valve bodies, providing a flow path from one element to another can often require a lengthy and convoluted path that adds to the complexity and size of the casting.

One method of overcoming this two-dimensional limitation includes manufacturing multiple valve bodies, each having its own two-dimensional worm trails, and connecting the valve bodies with one or more separator plates configured to permit fluid communication between the worm trails of the valve bodies in a third dimension at predetermined locations. Such separator plates require gasket seals and precise machining of the gasket surfaces. These separator plates also only allow binary cross-over of the hydraulic circuitry from one two-dimensional worm trail casting to another two-dimensional worm trail casting. Furthermore, the use of separator plates typically requires the use of additional fasteners to connect the assembly together, which can increase assembly time. Additionally, the two-dimensional worm trails of each valve body must be routed around these fasteners, adding further size and complexity.

These sizing and complexity issues related to transmission valve bodies, among other issues related transmission valve bodies, are addressed by the present disclosure.

SUMMARY

This section provides a general summary of the disclosure and is not a comprehensive disclosure of its full scope or all of its features.

In one form, the present disclosure provides a valve body assembly that includes a valve body, a pump, and a valve member. The valve body has multiple valve bores and hydraulic passages. The pump is coupled to the valve body and cooperates with the valve body to define a fluid circuit that is in communication with one or more of the hydraulic passages. The pump is configured to pump hydraulic fluid through the fluid circuit and into one or more of the hydraulic passages. The valve member is movable between a first position in which the valve member is seated against the pump to inhibit fluid flow through the fluid circuit and a second position in which the valve member is removed from the pump to permit fluid flow through the fluid circuit.

In variations of the valve body assembly of the above paragraph, which can be implemented individually or in any combination: when the valve member is in the first position, the valve member is seated against an external surface of the pump; the valve member is retained in the valve body in the first position and the second position; the pump defines a first aperture that opens through to a first side of the pump and the valve body defines a second aperture that opens through to a second side of the valve body, an area of the second aperture is greater than an area of the first aperture; the valve member includes an area that is greater than the area of the first aperture and less than the area of the second aperture; the valve member is disposed within the valve body; the pump is located entirely external to the valve body; the valve body is a unitized valve body; the valve body does not include mechanical fasteners; and the valve body is formed by additive manufacturing.

In another form, the present disclosure provides a valve body assembly that includes a valve body, a pump, and a valve member. The valve body has multiple valve bores and hydraulic passages. The pump is coupled to the valve body and cooperates with the valve body to define a fluid circuit that is in communication with one or more of the hydraulic passages. The pump is configured to pump hydraulic fluid through the fluid circuit and into one or more of the hydraulic passages. The valve member is movable between a first position in which the valve member is seated against the pump to inhibit fluid flow through the fluid circuit and a second position in which the valve member is removed from the pump to permit fluid flow through the fluid circuit. When the valve member is in the first position, the valve member is seated against an external surface of the pump. The valve member is retained in the valve body in the first position and the second position.

In variations of the valve body assembly of the above paragraph, which can be implemented individually or in any combination: the pump defines a first aperture that opens through to a first side of the pump and the valve body defines a second aperture that opens through to a second side of the valve body, an area of the second aperture is greater than an area of the first aperture; the valve member includes an area that is greater than the area of the first aperture and less than the area of the second aperture; the valve member is disposed at a location where the valve body and the pump contact each other; the valve member is disposed within the valve body; the pump is located entirely external to the valve body; the valve body is a unitized valve body; the valve body does not include mechanical fasteners; and the valve body is formed by additive manufacturing.

In yet another form, the present disclosure provides a valve body assembly that includes an additively manufactured valve body, a pump, and a valve member. The valve body has multiple valve bores and hydraulic passages. The pump is coupled to the valve body and cooperates with the valve body to define a fluid circuit that is in communication with one or more of the hydraulic passages. The pump is located entirely external to the valve body and is configured to pump hydraulic fluid through the fluid circuit and into one or more of the hydraulic passages. The valve member is movable between a first position in which the valve member is seated against the pump to inhibit fluid flow through the fluid circuit and a second position in which the valve member is removed from the pump to permit fluid flow through the fluid circuit. When the valve member is in the first position, the valve member is seated against an external surface of the pump. The valve member is retained in the valve body in the first position and the second position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
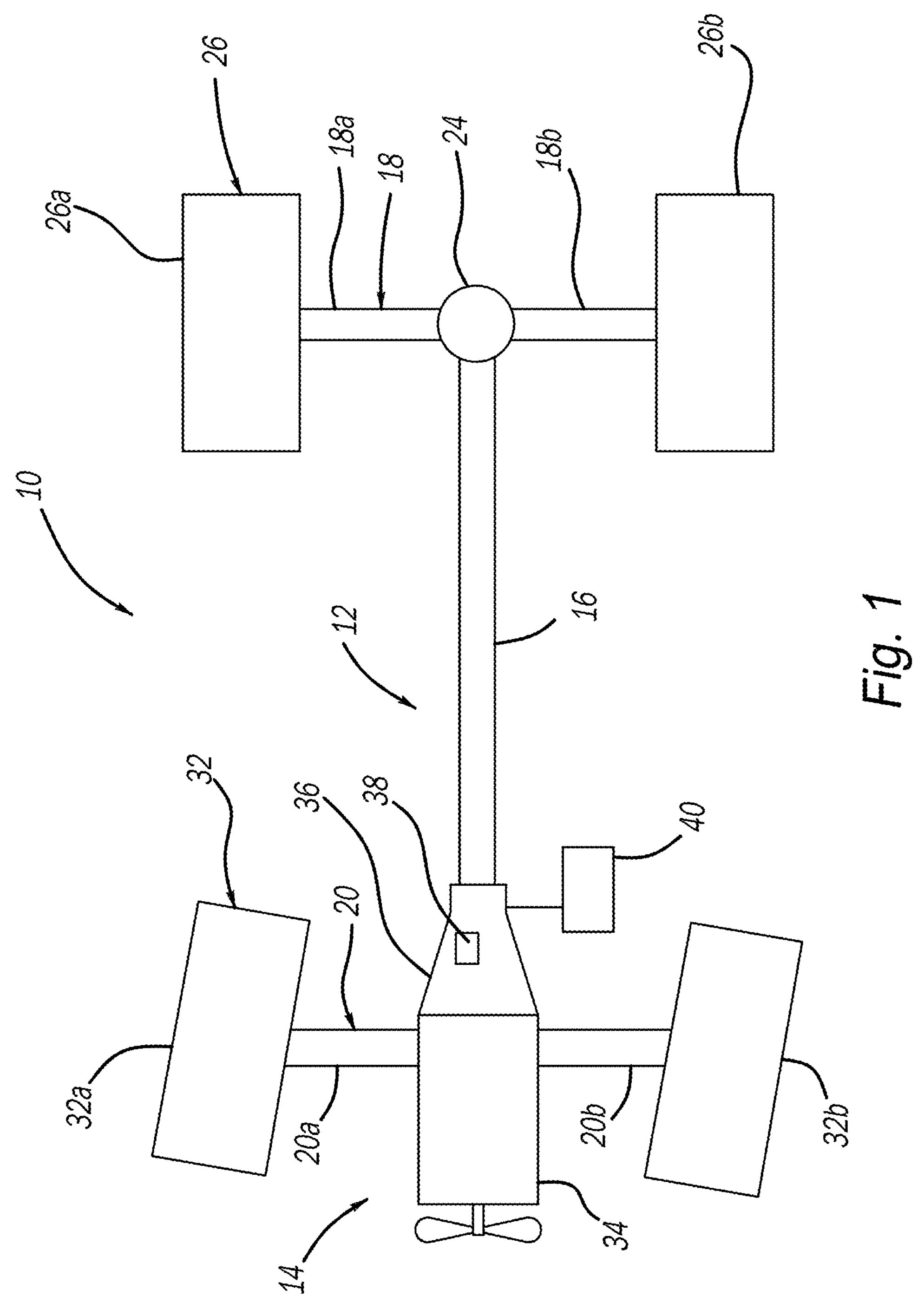
FIG. 1 is a schematic view of a vehicle including a transmission having a valve body assembly according to the principles of the present disclosure.
Figure 2:
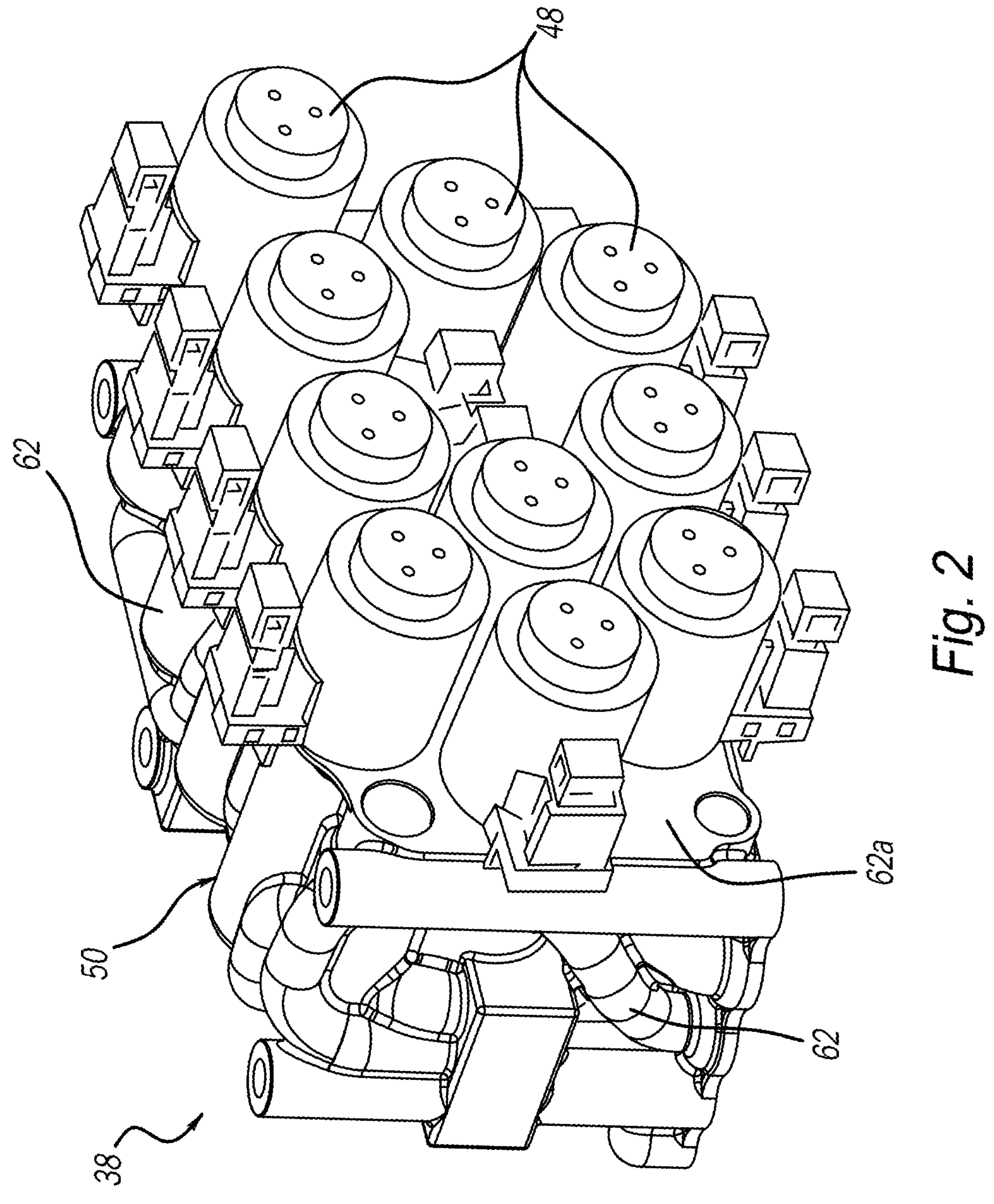
FIG. 2 is a perspective view of the valve body assembly of FIG. 1.
Figure 3:
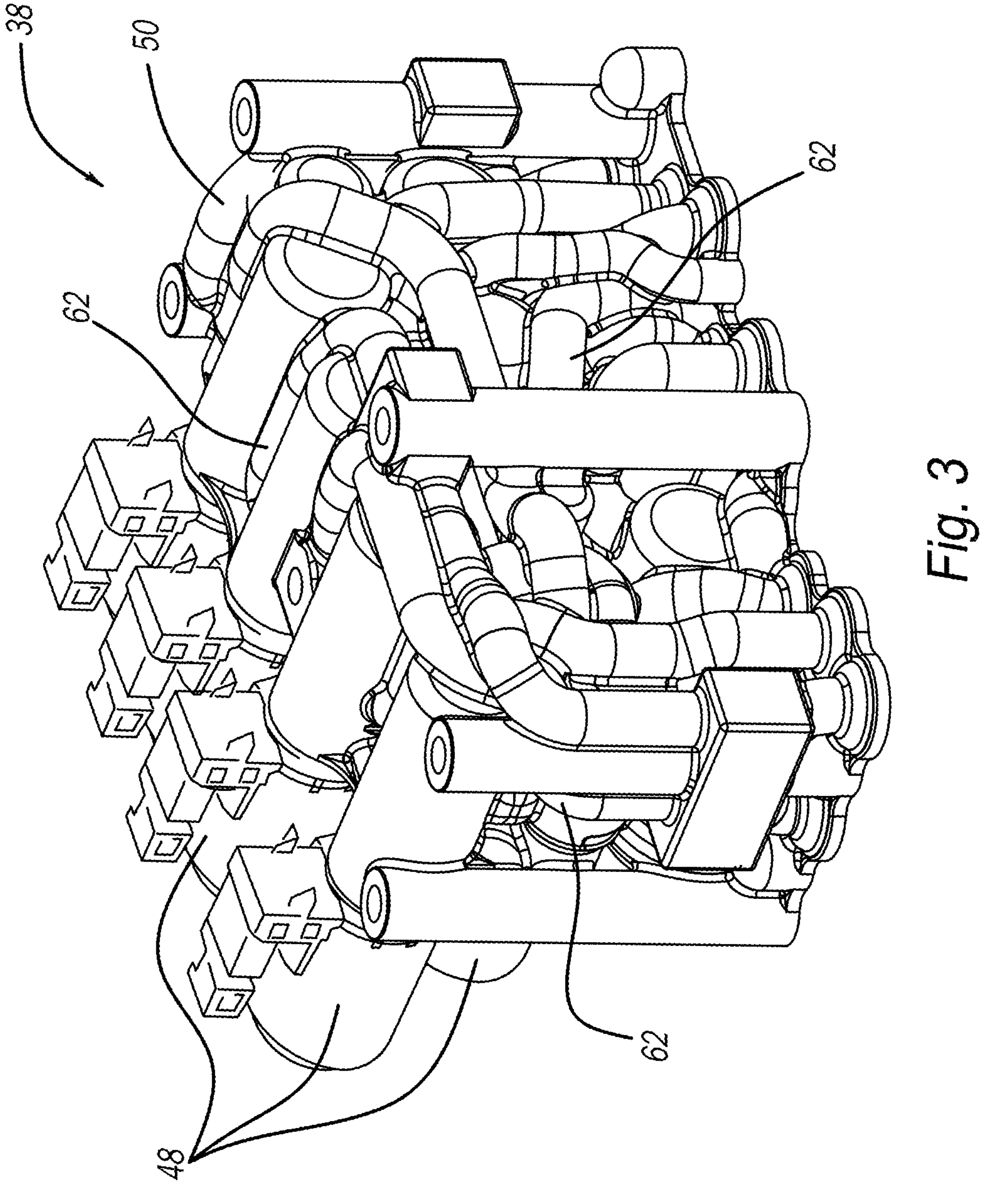
FIG. 3 is another perspective view of the valve body assembly of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotatory power generated by the powertrain system 14 is transmitted to the primary axle 18 via the propeller shaft 16 to drive a set of rear wheels 26. The primary axle 18 includes a first shaft **18*a* and a second shaft 18*b*. The first shaft 18*a* drives a first wheel 26*a* of the set of rear wheels 26 and the second shaft 18*b* drives a second wheel 26*b* of the set of rear wheels 26. The secondary axle 20 includes a first shaft 20*a* and a second shaft 20*b*. The first shaft 20*a* is connected to a first wheel 32*a* of a set of front wheels 32 and the second shaft 20*b* is connected to a second wheel 32*b* of the set of front wheels 32. The powertrain system 14 includes an engine 34 and a transmission 36 such as an automatic transmission, for example. The engine 34** generates rotary power and may be an internal combustion engine, for example.

The transmission 36 transmits rotary power from the engine 34 to the drivetrain system 12. The transmission 36 is generally controlled using hydraulic fluid. That is, the transmission 36 is cooled, lubricated, actuated, and modulates torque, for example, using hydraulic fluid. To these ends, the transmission 36 is in electrical communication with an electronic controller 40 used to direct, or control flow of fluid throughout the transmission 36. In order to facilitate the flow of hydraulic fluid throughout the transmission 36, the vehicle 10 includes one or more pumps to supply pressurized fluid to the transmission 36. It should be appreciated that the pumps provide high flow high pressure hydraulic fluid to the transmission 36.

Figure 6:
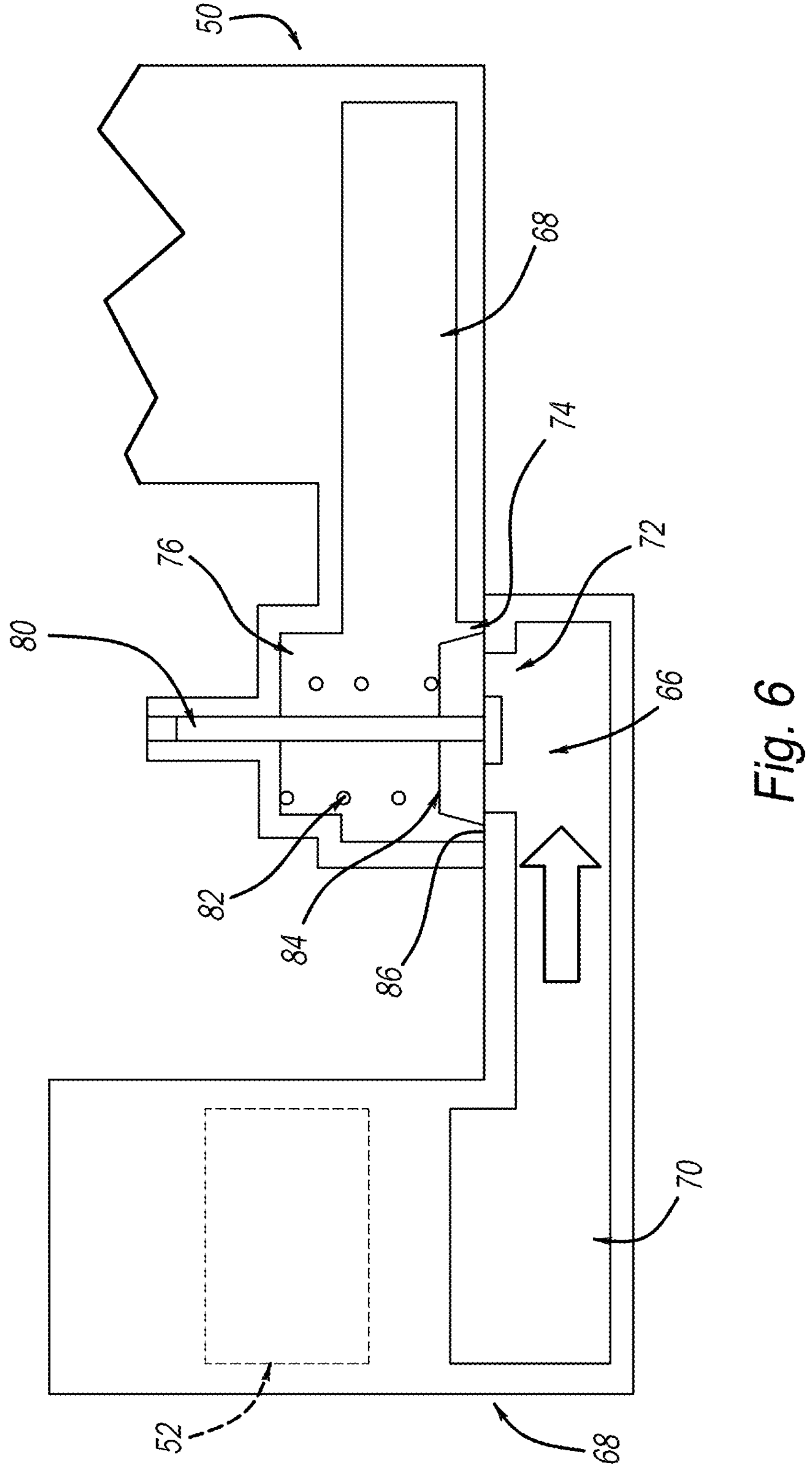
FIG. 6 is a schematic view of the valve body assembly of FIG. 1 including the valve body, a pump, and a valve with the valve in a closed position.
Figure 7:
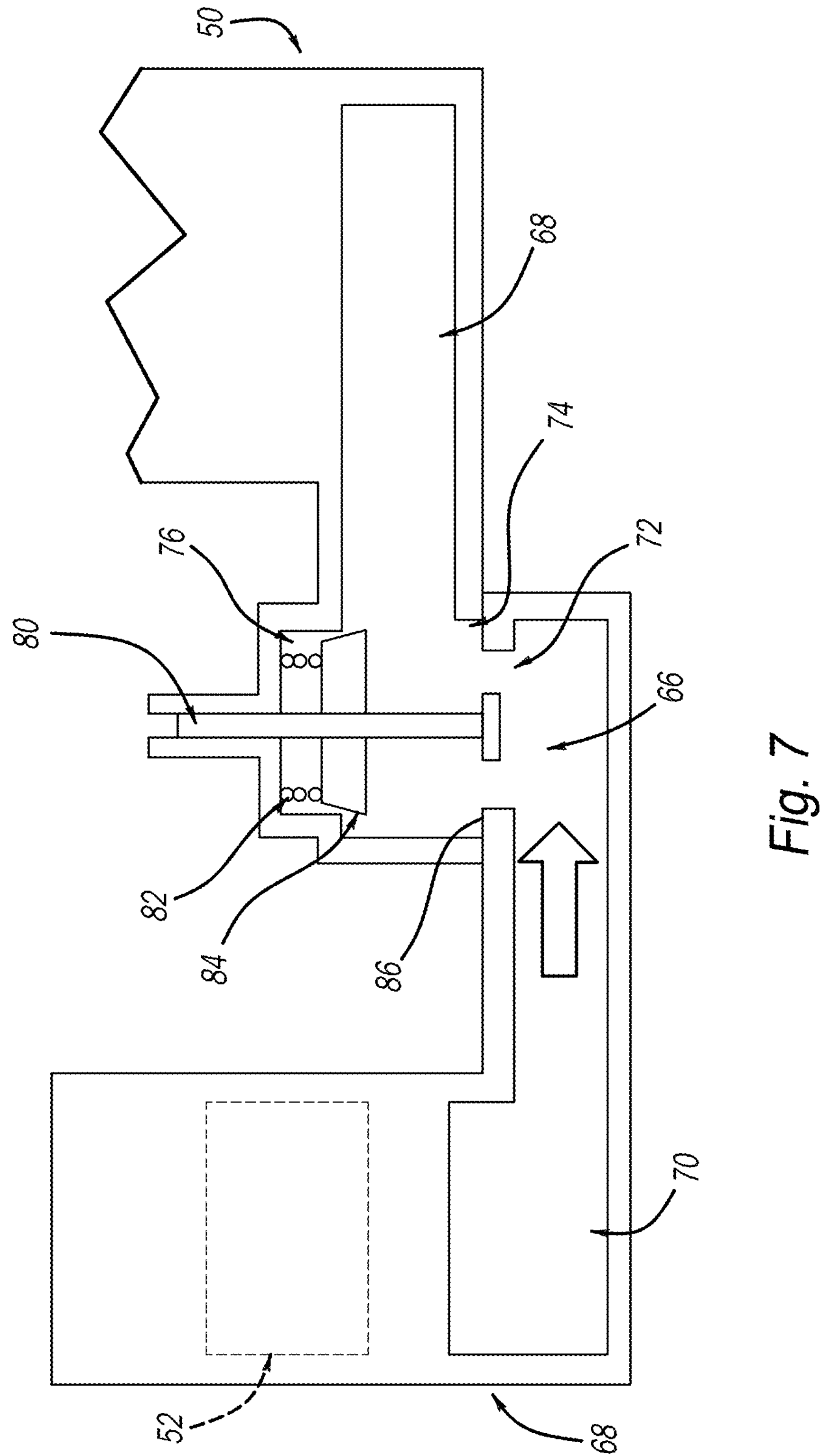
FIG. 7 is a schematic view of the valve body assembly of FIG. 1 including the valve body, the pump, and the valve with the valve in an open position.

The transmission 36 includes, inter alia, a casing (not shown) and a valve body assembly 38. With reference to FIGS. 2-7, the valve body assembly 38 is secured to the casing and includes a plurality of solenoid actuators 48 (FIGS. 2 and 3), a valve body 50 and at least one pump assembly 52 (FIGS. 6 and 7). Each solenoid actuator 48 includes a spool valve (i.e., hydraulic control valve). The spool valve is slidably disposed within a corresponding valve bore 53 of the valve body 50 and is configured to be axially positioned by an armature (not shown) of the solenoid actuator 48 depending on an activation state of the solenoid actuator 48. The spool valve includes a plurality of cylindrical sealing segments (not shown) axially spaced apart from each other and having an outer diameter greater than adjacent lengths of the spool valve. A cylindrical surface (not shown) of the sealing segments is allowed to engage an inner cylindrical surface of the valve bore 53, while fluid communication is permitted in the areas between adjacent ones of the sealing segments. The solenoid actuators 48 can be on/off actuators, variable pressure actuators, or variable flow actuators and can receive electrical power from an electrical source and can receive control signals from a control module.

In the example illustrated, the valve body 50 is in the form of a single unitized, monolithic body that can be manufactured by an additive manufacturing process. In this way, the valve body 50 does not include fasteners such as bolts, for example, securing two or more shells or housings to each other and/or to one or more separator plates. The manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

The valve body 50 includes a plurality of sides 62. In the example illustrated, side **62*a* of the valve body 50 defines the plurality of valve bores 53 formed therein. The valve body 50 also comprises a plurality of annuluses or rings 63 and a plurality of trunk hydraulic passages 64. With reference to FIGS. 5 and 6, the plurality of annuluses 63 are axially spaced apart from each other along a corresponding valve bore 53. The annuluses 63 are also in fluid communication with the corresponding valve bore 53. Each annulus 63 is also in fluid communication with corresponding passages 64 via connecting passages (not shown). One example of such annulus 63** is disclosed in Applicant's co-pending application titled "UNITIZED VALVE BODY HAVING ANNULUS" which is commonly owned with the present application and the contents of which are incorporated herein by reference in its entirety.

A plurality of passages 68 are in fluid communication with different devices through the transmission 36. For example, the connecting passages 68 can be coupled to a corresponding one of a return line of the pump assembly 52, an outlet of a cooling fluid circuit (not shown), a supply line of the pump assembly 52, a clutch lubrication circuit (not shown), a clutch actuator (not shown) corresponding to the odd numbered gears (not shown) of the transmission 36, a filtered fluid inlet (not shown), or a clutch actuator (not shown) corresponding to the even numbered gears (not shown) of the transmission 36, though other devices can be used.

Figure 4:
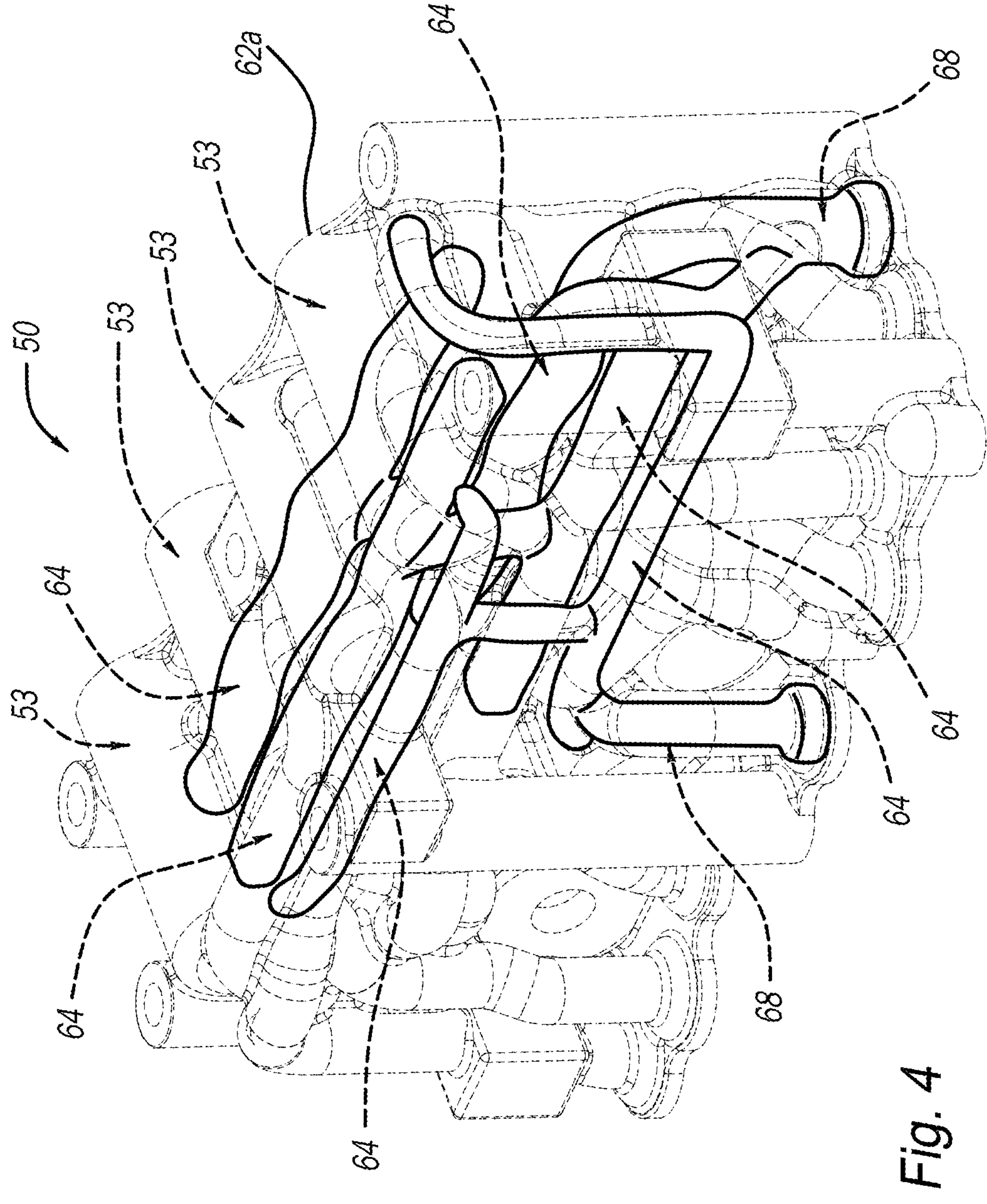
FIG. 4 is a perspective view of a valve body of the valve body assembly of FIG. 1.
Figure 5:
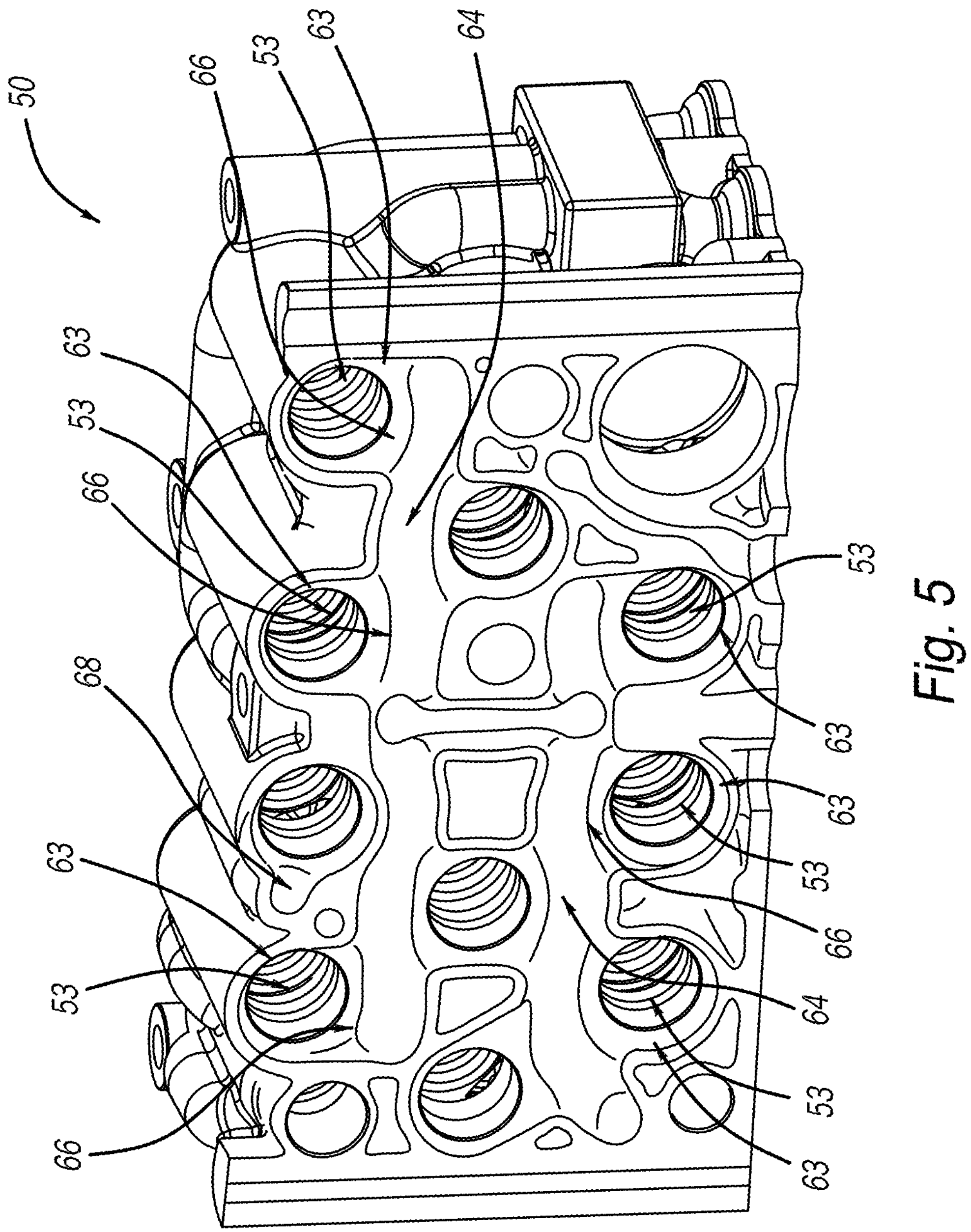
FIG. 5 is a cross-sectional perspective view of the valve body of the valve body assembly of FIG. 1.

With reference to FIGS. 4 and 5, the trunk hydraulic passages 64 may be connected to a pressurized fluid source such as the pump assembly 52 located external to the valve body 50. The trunk hydraulic passages 64 are also in fluid communication with the valve bores 53 and are arranged parallel to each other. The valve bores 53 extend normal to the trunk hydraulic passages 64 and are arranged above and below the trunk hydraulic passages 64 in a staggered arrangement. In the example illustrated, each trunk hydraulic passage 64 is substantially linear and has a generally circular cross-section. In some forms, the trunk hydraulic passages 64 may have a semi-circular or other suitable cross-section, for example, allowing hydraulic fluid to easily flow through. One or more of the trunk hydraulic passages 64 extend substantially a length of the valve body 50. One example of such trunk hydraulic passage 64 is disclosed in Applicant's co-pending application titled "UNITIZED VALVE BODY HAVING MULTIPLE FLOW PASSAGES" which is commonly owned with the present application and the contents of which are incorporated herein by reference in its entirety.

With reference to FIGS. 6 and 7, the pump assembly 52 is configured to pump hydraulic fluid through the valve body 50 and into the casing (not shown) of the transmission 36. The pump assembly 52 is secured to the casing and cooperates with the valve body 50 to define a fluid circuit 66 that is in communication with one or more of the hydraulic passages 64. Stated differently, the pump assembly 52 may engage the valve body 50 and includes a body 68 having a passage 70 that cooperates with at least one passage 68 of the passages 68 of the valve body 50 to define the fluid circuit 66. The pump assembly includes a pump 53 that is configured to pump hydraulic fluid through the fluid circuit 66, through one or more hydraulic passages 64 and into devices within the casing. The body 68 defines an aperture 72 that opens through a side of the pump assembly 52 and the valve body 50 defines an aperture 74 that opens through a side of the valve body 50. An area of the aperture 74 is greater than an area of the aperture 72. As shown in the figures, the pump assembly 52 is located entirely external (outside) of the valve body 50. Stated differently, the pump assembly 52 does not extend into the valve body 50.

A valve assembly 76 is disposed within the valve body 50 and is movable between a first position (FIG. 6; i.e., closed position) in which the valve assembly 76 inhibits fluid flow through the fluid circuit 66 and a second position (FIG. 7; i.e., open position) in which the valve assembly 76 permits fluid flow through the fluid circuit 66. Stated differently, the valve assembly 76 is located within the fluid circuit 66 at a location where the valve body 50 and the body 68 contact each other and is movable between the first position and the second position. The valve assembly 76 acts as a check valve such that fluid is allowed to flow in one direction while inhibiting fluid from flowing in the opposite direction. That is, a second pump (e.g., an electric pump) may be associated with the transmission 36 and may be configured to pump fluid through the valve body 50, for example. The valve assembly 76 may be in a closed position during operation of the second pump to inhibit fluid flow through the fluid circuit 66 and back into the pump assembly 52.

The valve assembly 76 includes a guide pin 80, a biasing member 82 (e.g., spring), and a valve member 84. The guide pin 80 is coupled to the valve body 50 and supports the valve member 84. Stated differently, the guide pin 80 is received in a groove in the valve body 50. The biasing member 82 is disposed within the valve body 50 and biases the valve member 84 toward the closed position. One end of the biasing member 82 is coupled to an internal surface of the valve body 50 and a second end of the valve body 50 is coupled to the valve member 84.

When the valve assembly 76 is in the closed position, the valve member 84 is seated against (sealingly engaged) the body 68 to inhibit fluid flow through the fluid circuit 66. When the valve assembly 76 is in the open position, the valve member 84 is removed from the body 68 to permit fluid flow through the fluid circuit 66. Stated differently, the valve member 84 may be entirely out of the flow path of the fluid circuit 66 when the valve assembly 76 is in the open position. As shown in the figures, the valve member 84 is seated against an external surface 86 of the body 68 when the valve assembly 76 is in the closed position. In this way, inserts or additional parts otherwise disposed within the valve body assembly 38 to act as a seat for the valve member 84 may be removed. The external surface of the pump 52 may be machined to enhance the sealing of the valve member 84 along the external surface of the pump 52 as well as enhance the sealing of the valve body 50 along the external surface of the pump 52.

It should be understood that the valve member 84 is retained in the valve body 50 in the open position and the closed position. That is, the valve member 84 includes an area that is greater than the area of the aperture 72 of the body 68 and less than the area of the aperture 74 of the valve body 50. In this way, the valve member 84 is disposed within the aperture 74 of the valve body 50 in the closed position and seated against the external surface 86 of the body 68, thus, is inhibited from entering the pump assembly 52. The guide pin 80 acts as a guide to the valve member 84 as the valve member 84 moves between the open position to the closed position. Stated differently, the valve member 84 moves along a length of the guide pin 80 between the closed position and the open position.

The valve body assembly of the present disclosure including the valve assembly 76 permits fluid to be pump into the valve body 50 when the valve member 84 is in the open position while inhibiting fluid to flow into the body 68 when the valve member 84 is in the closed position. It should be understood that although the valve body shown and described in the present disclosure is an additively manufactured valve body, in some configurations, the valve body may be a conventional valve body without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A valve body assembly comprising:

a valve body having multiple valve bores and hydraulic passages;

a pump coupled to the valve body and cooperating with the valve body to define a fluid circuit that is in communication with one or more of the hydraulic passages, the pump configured to pump hydraulic fluid through the fluid circuit and into the one or more of the hydraulic passages; and a valve member movable between a first position in which the valve member is seated against the pump to inhibit fluid flow through the fluid circuit and a second position in which the valve member is removed from the pump to permit fluid flow through the fluid circuit.

2. The valve body assembly of claim 1, wherein, when the valve member is in the first position, the valve member is seated against an external surface of the pump.

3. The valve body assembly of claim 1, wherein the valve member is retained in the valve body in the first position and the second position.

4. The valve body assembly of claim 1, wherein the pump defines a first aperture that opens through to a first side of the pump and the valve body defines a second aperture that opens through to a second side of the valve body, and wherein an area of the second aperture is greater than an area of the first aperture.

5. The valve body assembly of claim 4, wherein the valve member includes an area that is greater than the area of the first aperture and less than the area of the second aperture.

6. The valve body assembly of claim 1, wherein the valve member is disposed within the valve body.

7. The valve body assembly of claim 1, wherein the pump is located entirely external to the valve body.

8. The valve body assembly of claim 1, wherein the valve body is a unitized valve body.

9. The valve body assembly of claim 1, wherein the valve body does not include mechanical fasteners.

10. The valve body assembly of claim 1, wherein the valve body is formed by additive manufacturing.

11. A valve body assembly comprising:

a valve body having multiple valve bores and hydraulic passages;

a pump coupled to the valve body and cooperating with the valve body to define a fluid circuit that is in communication with one or more of the hydraulic passages, the pump configured to pump hydraulic fluid through the fluid circuit and into the one or more of the hydraulic passages; and a valve member movable between a first position in which the valve member is seated against the pump to inhibit fluid flow through the fluid circuit and a second position in which the valve member is removed from the pump to permit fluid flow through the fluid circuit, wherein, when the valve member is in the first position, the valve member is seated against an external surface of the pump, the valve member is retained in the valve body in the first position and the second position.

12. The valve body assembly of claim 11, wherein the pump defines a first aperture that opens through to a first side of the pump and the valve body defines a second aperture that opens through to a second side of the valve body, and wherein an area of the second aperture is greater than an area of the first aperture.

13. The valve body assembly of claim 12, wherein the valve member includes an area that is greater than the area of the first aperture and less than the area of the second aperture.

14. The valve body assembly of claim 11, wherein the valve member is disposed at a location where the valve body and the pump contact each other.

15. The valve body assembly of claim 11, wherein the valve member is disposed within the valve body.

16. The valve body assembly of claim 11, wherein the pump is located entirely external to the valve body.

17. The valve body assembly of claim 11, wherein the valve body is a unitized valve body.

18. The valve body assembly of claim 11, wherein the valve body does not include mechanical fasteners.

19. The valve body assembly of claim 11, wherein the valve body is formed by additive manufacturing.

20. A valve body assembly comprising:

an additively manufactured valve body having multiple valve bores and hydraulic passages;

a pump coupled to the valve body and cooperating with the valve body to define a fluid circuit that is in communication with one or more of the hydraulic passages, the pump located entirely external to the valve body and configured to pump hydraulic fluid through the fluid circuit and into the one or more of the hydraulic passages; and a valve member movable between a first position in which the valve member is seated against the pump to inhibit fluid flow through the fluid circuit and a second position in which the valve member is removed from the pump to permit fluid flow through the fluid circuit, wherein, when the valve member is in the first position, the valve member is seated against an external surface of the pump, the valve member is retained in the valve body in the first position and the second position.

* * * * *